United States Patent
Han et al.

(10) Patent No.: US 7,940,764 B2
(45) Date of Patent: May 10, 2011

(54) METHOD AND SYSTEM FOR PROCESSING MULTICAST PACKETS

(75) Inventors: Yongxiang Han, Beijing (CN); Wei Shao, Shenzhen (CN); Jian Dou, Shenzhen (CN); Hang Yuan, Beijing (CN); Jun Tang, Shenzhen (CN)

(73) Assignee: Intel Corporation, Santa Clara, CA (US)

( * ) Notice: Subject to any disclaimer, the term of this patent is extended or adjusted under 35 U.S.C. 154(b) by 1479 days.

(21) Appl. No.: 10/567,001

(22) PCT Filed: Aug. 12, 2004

(86) PCT No.: PCT/CN2004/000935
§ 371 (c)(1),
(2), (4) Date: Jan. 31, 2006

(87) PCT Pub. No.: WO2006/015513
PCT Pub. Date: Feb. 16, 2006

(65) Prior Publication Data
US 2006/0268868 A1    Nov. 30, 2006

(51) Int. Cl.
*H04L 12/56* (2006.01)
(52) U.S. Cl. .................... 370/390; 370/412; 370/432
(58) Field of Classification Search .................... None
See application file for complete search history.

(56) References Cited

U.S. PATENT DOCUMENTS

| | | | |
|---|---|---|---|
| 6,038,592 A * | 3/2000 | Verplanken et al. | 370/390 |
| 6,246,682 B1 * | 6/2001 | Roy et al. | 370/390 |
| 6,310,879 B2 * | 10/2001 | Zhou et al. | 370/397 |
| 6,724,761 B1 | 4/2004 | Moy-Yee et al. | |
| 6,850,522 B2 * | 2/2005 | Hasegawa et al. | 370/390 |
| 6,873,627 B1 * | 3/2005 | Miller et al. | 370/466 |
| 7,079,501 B2 * | 7/2006 | Boivie | 370/312 |
| 7,280,542 B2 * | 10/2007 | Hassan-Ali et al. | 370/390 |
| 7,397,809 B2 * | 7/2008 | Wang | 370/390 |
| 2002/0093960 A1 * | 7/2002 | Tsuchiya et al. | 370/390 |
| 2002/0154634 A1 * | 10/2002 | Basso et al. | 370/390 |
| 2003/0076828 A1 * | 4/2003 | Henrion | 370/390 |

(Continued)

FOREIGN PATENT DOCUMENTS

KR    2002-0054228    7/2002

OTHER PUBLICATIONS

Intel Corporation, "Intel IXP2400 Network Processor", *Hardware Reference Manual*, Apr. 2003, pp. 1-414.

(Continued)

*Primary Examiner* — Chirag G Shah
*Assistant Examiner* — Joshua Smith
(74) *Attorney, Agent, or Firm* — Konrad Raynes & Victor LLP; David W. Victor

(57) ABSTRACT

Provided are a method, system, and program for processing multicast packets. A multicast packet is received to transmit to destination addresses. A payload of the multicast packet is written to at least one packet entry in a packet memory. Headers are generated for the destination addresses and at least one descriptor is generated addressing the at least one packet entry in the packet memory including the payload to transmit to the destination addresses. For each destination address, at least one indicator is generated including information on the generated header for the destination address and the at least one descriptor, wherein indicators for the destination addresses address the at least one descriptor.

40 Claims, 11 Drawing Sheets

U.S. PATENT DOCUMENTS

2003/0093557 A1    5/2003   Giraud et al.
2004/0095934 A1*   5/2004   Cheng et al. .................. 370/390
2004/0114616 A1*   6/2004   Wang ............................. 370/412
2004/0202163 A1*  10/2004   Lee ................................ 370/390
2005/0111452 A1*   5/2005   Mamillapalli et al. ........ 370/390
2005/0213545 A1*   9/2005   Choyi et al. ................... 370/338

OTHER PUBLICATIONS

Intel Corporation, "Intel IXP2400/IXP2800 Network Processor", *Programmer's Reference Manual*, Jul. 2003, pp. 1-569.
PCT International Search Report and Written Opinion for International Application No. PCT/CN2004/000935, dated May 11, 2005.

* cited by examiner

METHOD AND SYSTEM FOR PROCESSING MULTICAST PACKETS

BACKGROUND

Systems in a network environment communicate information in packets that encapsulate the information according to network communication protocols. Packets transmitted from one node to another node may be transmitted through one or more intervening routers that route the packets throughout the network or between networks. The router typically includes one or more network processors to process the packets and may also include a core processor. The network processor stores packets in a memory device, such as a Static Dynamic Random Access Memory (SDRAM). When a packet is added to the SDRAM, an entry, referred to as a buffer descriptor, is added to a packet queue in another memory device, such as a Static Random Access Memory (SRAM), which is used to maintain control information on the packets added to the SDRAM. The SRAM may include multiple queues for packets in the SDRAM.

A network processor may include a plurality of packet engines, also known as microengines, that process and forward the packets being transmitted from one node to another and may also include a core processor to perform other related processing information. In certain prior art network processors having packet engines as well as a core processor, the packet engines may process unicast packets and the core processor may process multicast packets having a payload to transmit to different destination addresses.

Further, when processing a multicast packet, the core processor may write an instance of the multicast packet payload to the SDRAM for each destination address to which the packet is directed. A buffer descriptor may also be created and queued for the entries added to the SDRAM for the destination addresses of the multicast packet. Thus, multiple entries in the SDRAM are used to buffer the same payload sent to the different destination addresses. The entries in the SDRAM include a unique header for the different destination addresses, where the header includes address and other information to route the payload of the multicast packet to the destination address.

DETAILED DESCRIPTION

In the following description, reference is made to the accompanying drawings which form a part hereof and which illustrate several embodiments. It is understood that other embodiments may be utilized and structural and operational changes may be made without departing from the scope of the embodiments.

Figure 1:
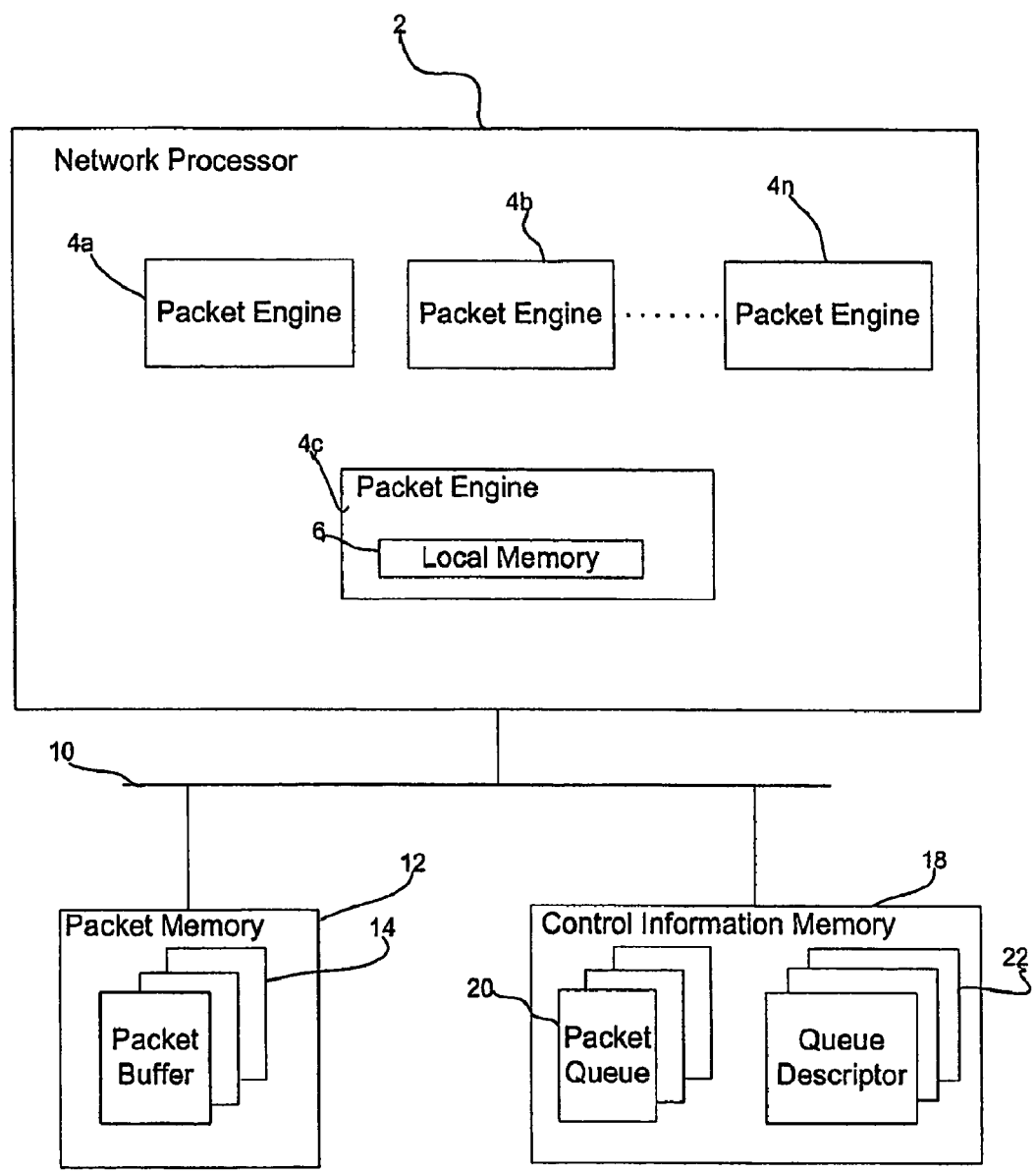
FIG. 1 illustrates a network processor.

A network processor comprises devices that execute programs to handle packets in a data network, such as processors on router line cards, network access equipment and packet forwarding devices. FIG. 1 illustrates a network processor 2 according to one embodiment including packet engines 4a, 4b . . . 4n comprising high speed processors specialized for packet processing. The packet engines may comprise any programmable engine or processor for processing packets, such as a microengine, etc. The packet engines may execute program logic, such as microblocks, to process packets, where a microblock comprises fast-path packet processing logic executed by the packet engines 4a, 4b . . . 4n.

The network processor packet engines 4a, 4b . . . 4n buffer packets and other information used to process packets in a local memory, such as local memory 6 for packet engine 4c. The local memory 6 may be implemented on the same integrated circuit die on which the packet engine 4c is implemented and may comprise a content address memory.

The network processor 2 may communicate over one or more memory interfaces 10 with a packet memory 12 for storing packet entries 14 and a control information memory 18 storing packet queues 20 and queue descriptors 22 defining the packet queues 20. The packet entries 14 comprise buffers, each including the payload and header information for a packet transmission. The packet queues 20 include the buffer indicators, where for a multicast packet there is one buffer indicator associated with each descriptor and packet entry for a destination address. Thus, for each destination address, there are buffer indicators referencing the same buffer descriptors, which reference packet buffers 14 in the packet memory 12. If the multicast packet payload occupies multiple buffers, then there may be one buffer descriptor for each packet buffer used by the multicast packet and for each buffer used by the multicast packet, there is one indicator for each destination address. Otherwise, if the multicast packet payload uses only one data buffer, then there may be just one buffer descriptor and one buffer indicator for each destination address. In certain embodiments, the packet memory 12 may comprise at least one SDRAM and the control information memory 18 may comprise at least one SRAM, such as a Quad Data Rate (QDR) high bandwidth SRAM. However, other types of memory devices known in the art may also be used. Further, in alternative embodiments, the packet memory 12 and control information memory 18 may be within different memory areas of the same memory device or in different memory areas of different memory devices. The reference numbers 14, 20, and 22 may represent one or more of the referenced items.

Figure 2A:
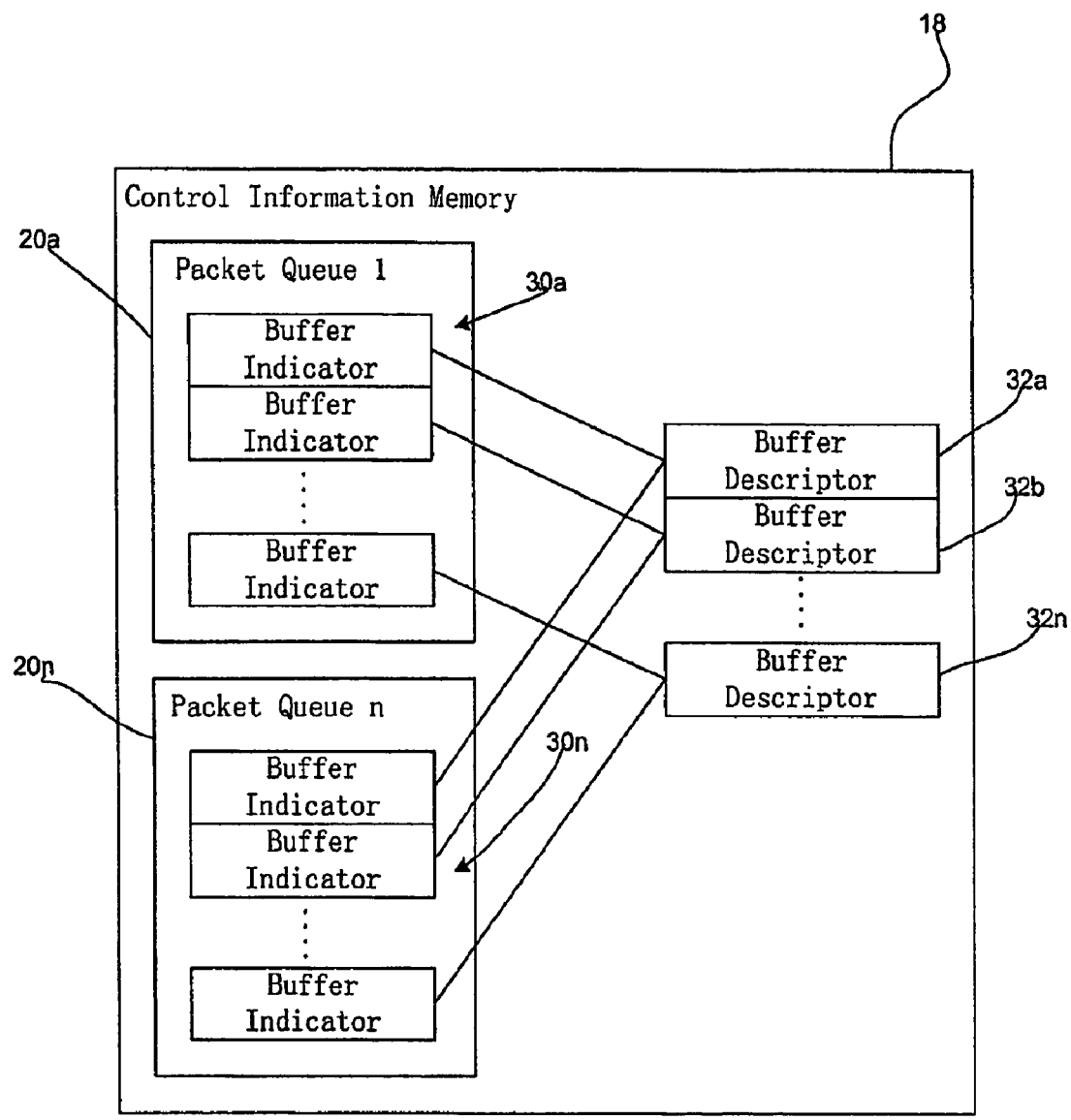
FIGS. 2a and 2b illustrate information maintained in a control information memory.

FIG. 2a illustrates one embodiment of packet queues 20a . . . 20n for a single buffer packet, i.e., where the multicast packet requires one buffer. There is one packet queue 20a . . . 20n for each destination address and each queue 20a . . . 20n includes one buffer indicator 30a . . . 30n for each buffer descriptor addressing a packet buffer storing the payload. Because each output packet has the same data, the buffer indicators for each destination address in each packet queue 20a . . . 20n, address the same buffer descriptors, as shown in FIG. 2a. The buffer indicators at the same position in the packet queues 20a . . . 20n reference the same buffer descriptors of data to send for the multi-cast operation. If a packet queue includes multiple buffer indicators, each buffer indicator in one queue provides the data for a separate multi-cast packet. For instance, the first buffer indicator in each packet queue 20a ... 20bn addresses the same buffer descriptor 32a corresponding to one packet entry having the payload to send to the destination address.

Figure 2B:
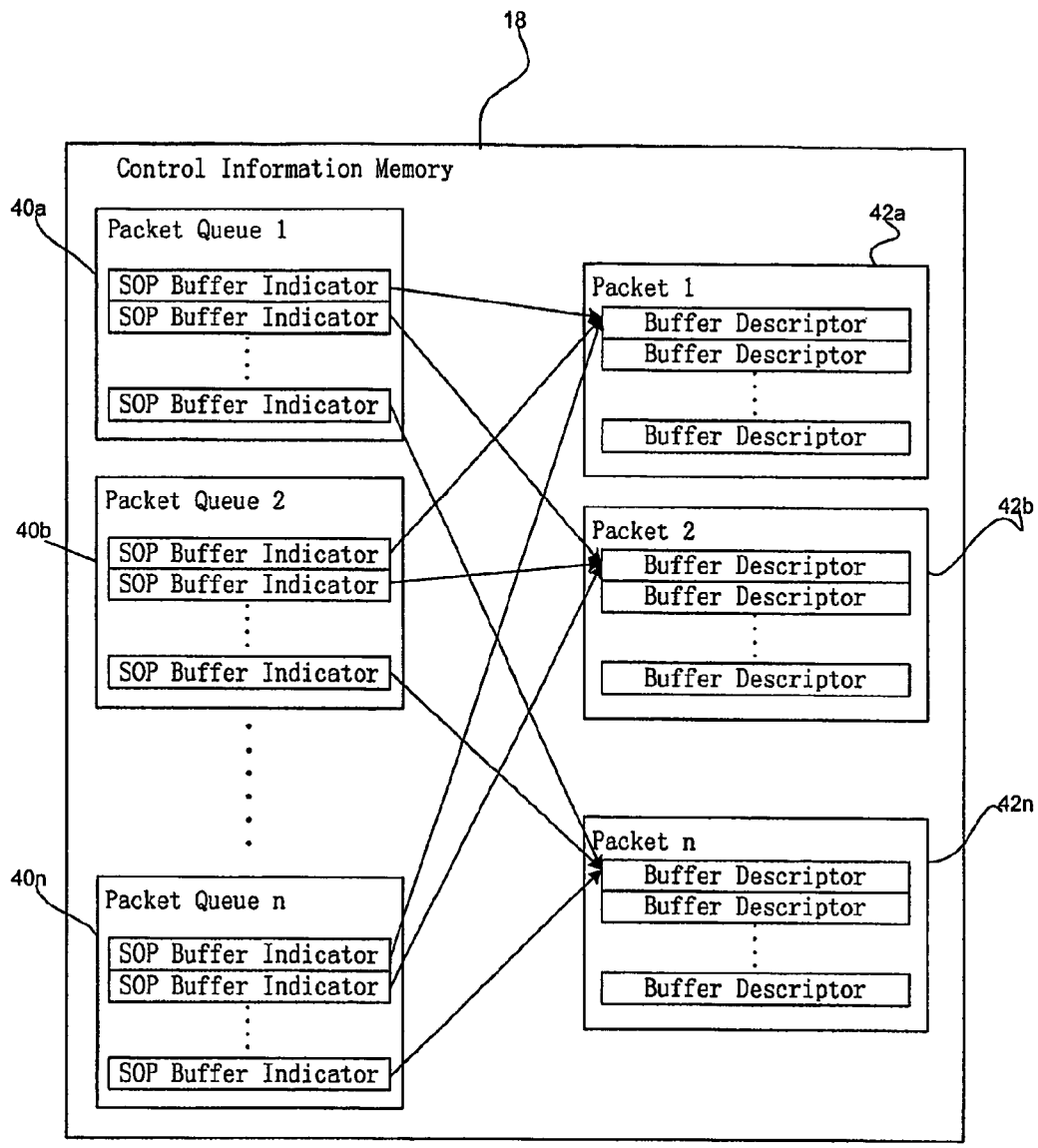

FIG. 2b illustrates one embodiment of the information included in the control information memory 18 for a multi-buffer payload in a multicast packet. For each destination address, there is one packet queue 40a ... 40n. Each packet queue 40a ... 40n includes one start of packet (SOP) buffer indicator, which points to the (SOP) buffer descriptor to include in the payload for each multicast packet. Each packet 42a, 42b ... 42n provides the payload for the destination addresses in a multi-cast packet and includes a first buffer descriptor addressed by the SOP buffer indicator in each packet queue 40a, 40b ... 40n and following buffer descriptors addressing further packet buffers for the payload. For instance, the first SOP buffer indicator in each packet queue 40a ... 40n points to the same buffer descriptor in the same packet 42a providing the payload for the multicast packet. The second SOP buffer indicator in each packet queue 40a, 40b ... 40n points to the same buffer descriptor in the same packet 42b providing the payload for a next multi-cast packet.

In situations where the packet occupies only a single data buffer, there is only one buffer indicator in each packet queue addressing the same buffer descriptor.

Figure 3:
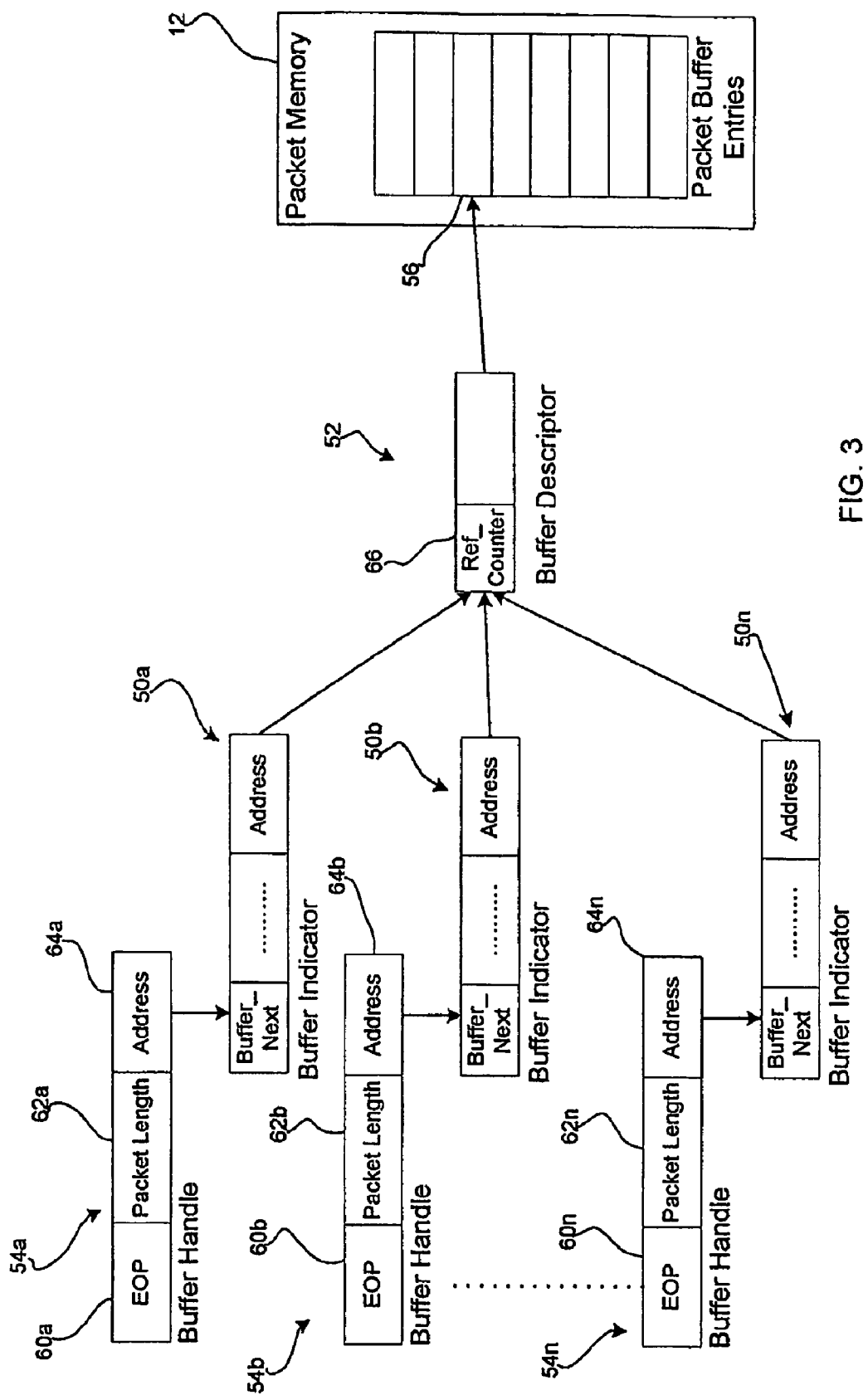
FIG. 3 illustrates data structures to maintain information for a multicast packet.

FIG. 3 illustrates one embodiment of a data structure having a plurality of buffer indicators 50a, 50b ... 50n. In certain embodiments, one buffer indicator is generated for each destination address of the multicast packet. Each buffer indicator 50a, 50b ... 50n generated for the multicast packet includes the address of the buffer descriptor 52 that may be used to access the payload for the multicast packet that is sent to all destination addresses. For each buffer indicator 50a, 50b ... 50n, a buffer handle 54a, 54b ... 54n is generated, where the buffer handle 54a, 54b ... 54n includes the address of the corresponding buffer indicator 50a, 50b ... 50n in the control information memory 18, e.g., SRAM address. The buffer descriptor 52 is used to access a packet buffer entry 56 in the packet memory 12. For instance, the packet buffer 56 address in the packet memory 12 may be calculated from the buffer descriptor 52 address stored in each buffer indicator 50a, 50b ... 50n. Alternatively, the buffer descriptor 68 may include the address of the packet buffer 56 corresponding to the buffer descriptor 52.

With the described embodiments, one buffer indicator 50a, 50b ... 50n generated for each destination address addresses one buffer descriptor 52, so that one packet buffer entry in the packet memory 12 maintains the payload used for multiple destination addresses of the multicast packet. If multiple buffer indicators are generated for a destination address, i.e., output packet, then the buffer indicators address different buffer descriptors corresponding to different packet buffer entries containing the data for the multi-buffer packet.

The buffer handles 54a, 54b ... 54n may include an end of packet (EOP) field 60 indicating whether the buffer handle 54a, 54b ... 54 is associated with the last data buffer for a packet in the multicast transmission; a packet length field 62 indicating the length of the packet to be transmitted to the destination address; and an address field 64 having the address of the associated buffer indicator 50a, 50b ... 50n in the control information memory 18. The buffer descriptor 52 addressed by the buffer indicators 50a, 50b ... 50n further includes a reference counter 66 indicating the number of destination addresses to receive the multicast packet and an address 66 of the packet buffer entry 54 in the packet memory 12 including the payload to transmit to each destination address.

If a packet requires only one data buffer, then there is only one buffer handle and buffer indicator for the packet for each destination address. In such case of a single buffer packet, the EOP field 60 is set to a fixed value. However, in certain situations, a packet may require multiple data buffers, i.e., a multi-buffer packet. For instance, if the size of the packet buffer is 2048 bytes and the packet is larger than 2048 bytes, then the packet requires multiple packet buffers. In such case, there may be one buffer handle and buffer indicator for each of the data buffers used by the packet. The buffer handles for the data buffers at the start of the packet and middle of the packets may have an end of packet field 60 of zero, indicating that they are not the end of the packet and the buffer handle for the last data buffer of the packet has an end of packet field of one.

FIG. 3 illustrates the buffer handles and buffer indicators for a single data buffer for the multicast packet if the multicast packet is a single buffer packet. In embodiments where the multicast packet occupies multiple buffers, then there may be a set of buffer handles, indicators and buffer descriptor shown in FIG. 3 generated for each packet buffer entry in the packet memory 12 having payload data. Further, the buffer_next handle for each indicator may address the next indicator for an output packet, i.e., destination address, addressing the buffer descriptor containing the next buffer to include in the packet. Further, for a multi-buffer packet, the EOP field 60a, 60b ... 60bn indicates whether the buffer handle, buffer indicator and buffer descriptor for one destination address are for the start of the packet, i.e., first buffer in the packet, a middle of the packet, or the end of packet, i.e., the last packet in the buffer. The EOP value for a start of packet and middle of packet in a multi-buffer packet may be the same value, i.e., indicating that the indicator buffer handle is not for the last indicator.

Figure 4:
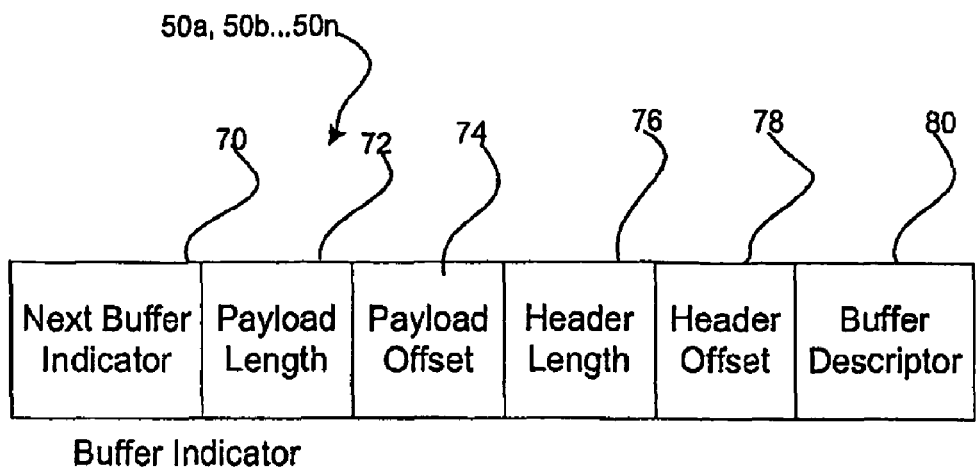
FIG. 4 illustrates information maintained in a buffer indicator.

FIG. 4 illustrates one embodiment of the information that may be included with each buffer indicator 50a, 50b ... 50n, including:

Next Buffer Indicator 70: indicates a next buffer 50b, 50c ... 50n indicator for the subsequent destination address, where the information on the next buffer in each buffer indicator forms a linked list or chain of buffer indicators, where the last buffer indicator 50n may include a null value for the next buffer indicator field 70. For a single buffer packet, the buffer_next indicates that there is no next indicator and next buffer descriptor for the packet. For a multi-buffer packet, the buffer next indicator points to the next buffer indicator and buffer descriptor for a next buffer to be included in the packet. If the buffer indicator is for a middle of packet or start of packet buffer handle, then the next buffer indicator points to the next indicator corresponding to next buffer for the packet. If the buffer indicator is for the end of packet buffer handle, then the next buffer indicator indicates no next indicator for that packet.

Payload Length 72: The length of the payload to be included in the packet transmitted to the destination address associated with the buffer indicator 50a, 50b ... 50n.

Payload Offset 74: an offset into the packet buffer entry 54 where the payload starts. The payload to include in the packet to the destination address is determined from the payload offset 74 and payload length 72.

Header Length 76: the length of a header to include in the packet transmitted to the destination address associated with the buffer indicator 50a, 50b ... 50n.

Header Offset 78: an offset into the packet buffer entry 54 where the header for the destination address starts. The header to include in the packet to the destination address is determined from the header offset 64 and header length 78.

Buffer Descriptor 80: the address of the buffer descriptor 52 in the control information memory 18.

Figure 5:
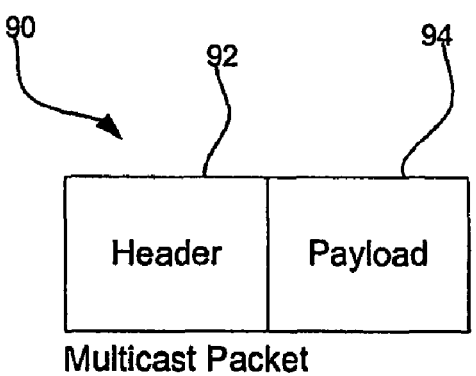
FIG. 5 illustrates content of a multicast packet.

FIG. 5 illustrates one embodiment of a multicast packet 90 having a header 92 and payload 94. The header 92 indicates the destination addresses, where the payload 94 is transmitted to the destination addresses and is comprised of one or more buffers.

Figure 6:
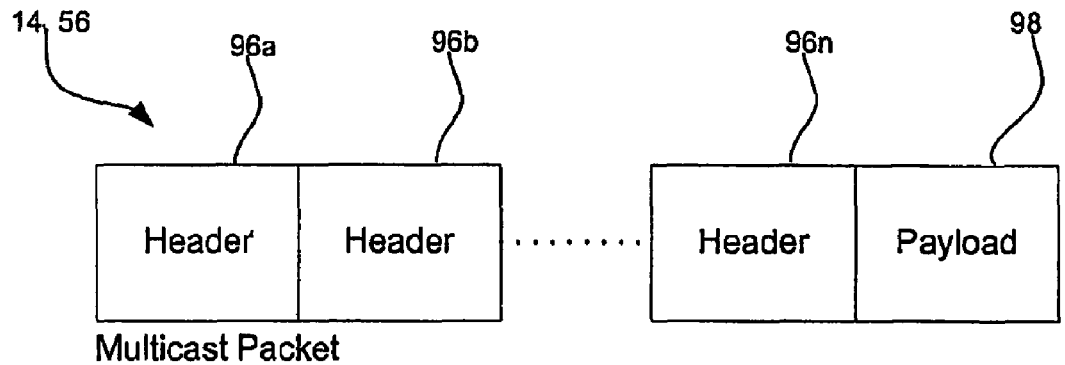
FIG. 6 illustrates a packet entry in the packet memory.

FIG. 6 illustrates one embodiment of the content in the packet entries, e.g., 14 (FIG. 1), 56 (FIG. 3). The packet entry 14, 56 includes headers 96a, 96b . . . 96n for each destination address of the multicast packet 90 and the payload 98. In this way, only one entry having one payload for all the destination addresses is maintained. The packet entry 96 may be addressed by one buffer descriptor 52.

Figure 7:
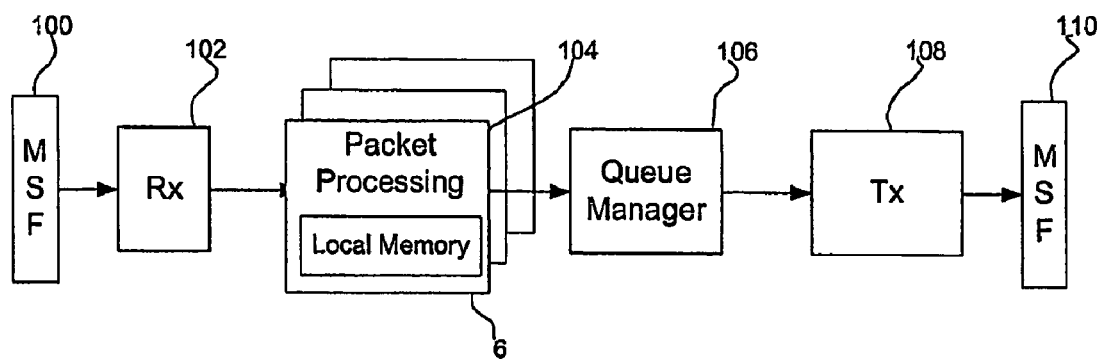
FIG. 7 illustrates the packet engines that process a multicast packet.

FIG. 7 illustrates one embodiment of the functional role of the packet engines 4a, 4b . . . 4n to process packets. A multicast packet 90 (FIG. 5) is received on a media switch fabric 100 and forwarded to one packet engine functioning as a receiving block (Rx) 102 that receives the multicast packet from the media switch fabric 100. The multicast packet 90 is then received by a packet engine 4a, 4b . . . 4n function as a packet processing block 104, which generates and sets the buffer handles 54a, 54b . . . 54n, buffer indicators 50a, 50b . . . 50n, buffer descriptors, and the packet buffer entries in the packet memory 12. The packet processing block 104 uses local memory 6 when generating and setting the buffer handles, indicators, and descriptors. A packet engine functioning as a queue manager 106 uses the buffer handles to enqueue and dequeue the buffer indicators 30a . . . 30n into and out of packet queues 20a . . . 20n in the control information memory 18. A packet engine functioning as a transmission (Tx) block 108 uses buffer handles sent by the queue manager to access the buffer indicators, corresponding buffer descriptors and packet buffers in the packet memory 12 by reading the header and payload of the multicast packet to transmit the payloads to media switch fabric 110.

Figure 8:
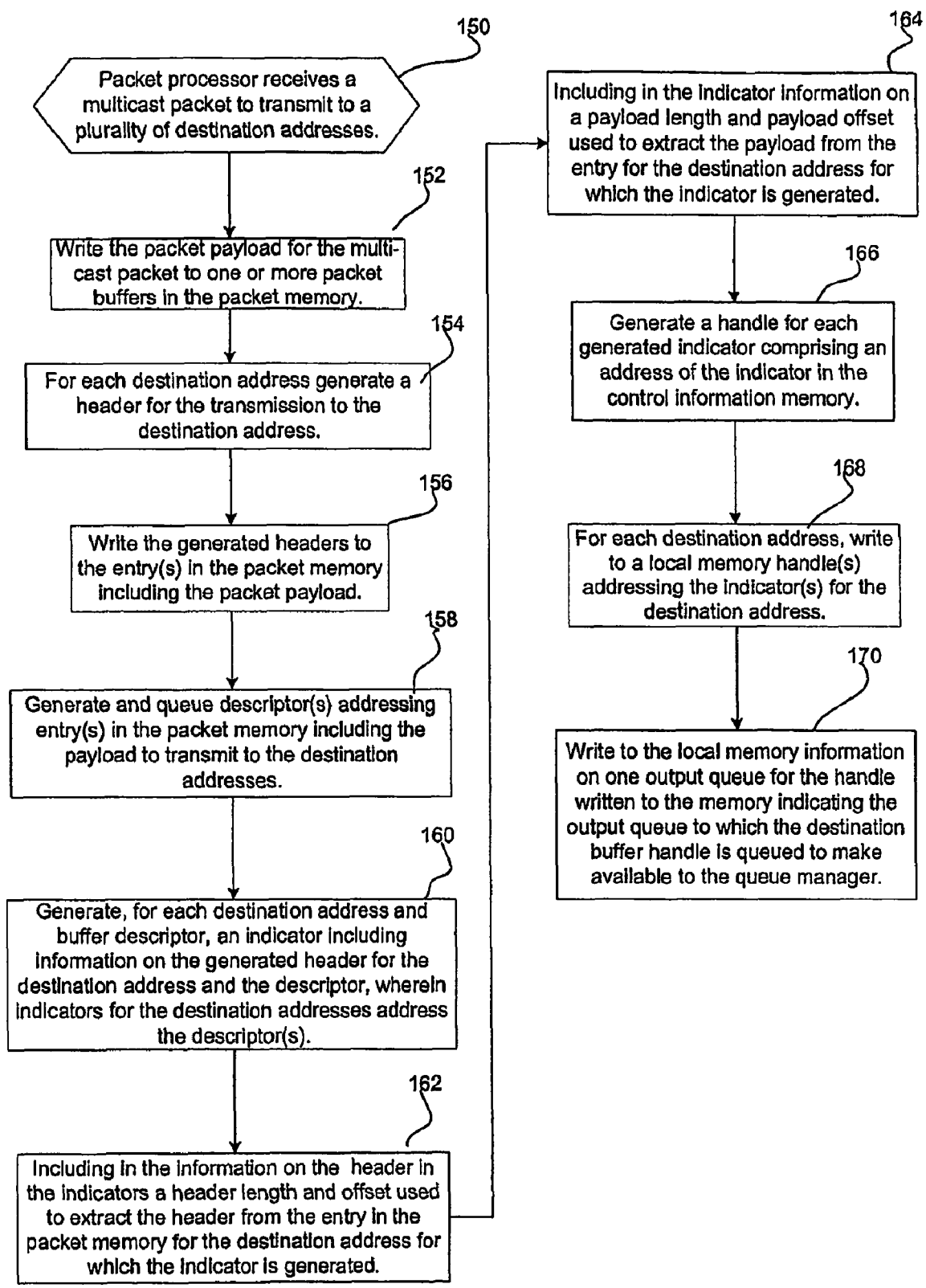
FIGS. 8 and 10 illustrate operations to process a multicast packet.

FIG. 8 illustrates one embodiment of operations the packet processing 104 block implemented in one packet engine, e.g., packet engine 4c, performs to setup the buffer indicators 50a, 50b . . . 50n and other data structures for a multicast packet 90. Upon the packet engine 4c receiving (at block 150) a multicast packet 90 (FIG. 5) to transmit to a plurality of destination addresses, the packet processing block 104 writes (at block 152) the packet payload 94 for the multicast packet 90 to the payload 98 (FIG. 6) in one or more packet entries, e.g., 14 (FIG. 1), 56 (FIG. 3), in the packet memory 12. As discussed, multi-buffer packets occupy multiple packet buffers 14 in the packet memory 12. For each destination address, the packet processing block 104 generates (at block 154) a header for the transmission to the destination address and writes (at block 156) the generated headers 96a, 96b . . . 96n (FIG. 6) to the one or more entries, e.g., 54 (FIG. 3), in the packet memory 12 including the packet payload 98. In certain embodiments, the generated headers 96a, 96b . . . 96n may be written preceding the payload packet entries as shown in FIG. 6. The packet processing block 104 further generates (at block 158) and queue indicator(s) other than the queue descriptors. The packet processing block 104 further generates (at block 160), for each destination address and buffer descriptor, an indicator 50a, 50b . . . 50n including the information on the generated header 96a, 96b . . . 96n (FIG. 6) for the destination address and the descriptor 52 (FIG. 3), wherein the indicators 50a, 50b . . . 50n for the destination addresses address the one or more descriptors 54.

The information on the header in the indicator 50a, 50b . . . 50n may further include (at block 162) a header length 76 (FIG. 4) and offset 78 that is used to extract the header 96a, 96b . . . 96n (FIG. 6) from the entry 56 in the packet memory 12 for the destination address for which the indicator 50a, 50b . . . 50n is generated. The indicator information may also include (at block 164) a payload length 72 and payload offset 74 that is used to extract the payload 98 from the entry 56 for the destination address for which the indicator 50a, 50b . . . 50n is generated. The packet processing block 104 generates (at block 166) a handle 54a, 54b . . . 54n for each generated indicator 50a, 50b . . . 50n, where the handle includes an address of the indicator 64a in the control information memory 18. The packet processing block 104 writes, for each destination address, (at block 168) the one or more handles 54a, 54b . . . 54n addressing the one or more indicators 50a, 50b . . . 50n for the destination address to the local memory 6. The packet processing block 104 further writes (at block 170) to the local memory 6 information on one output queue for the handles 54a, 54b . . . 54n written to the memory 6 indicating the output queue to which the buffer handle is queued to make available to the queue manager 106. The packet processing block 104 queues the buffer handles in the output queues to make available to the queue manager 106.

Figure 9:
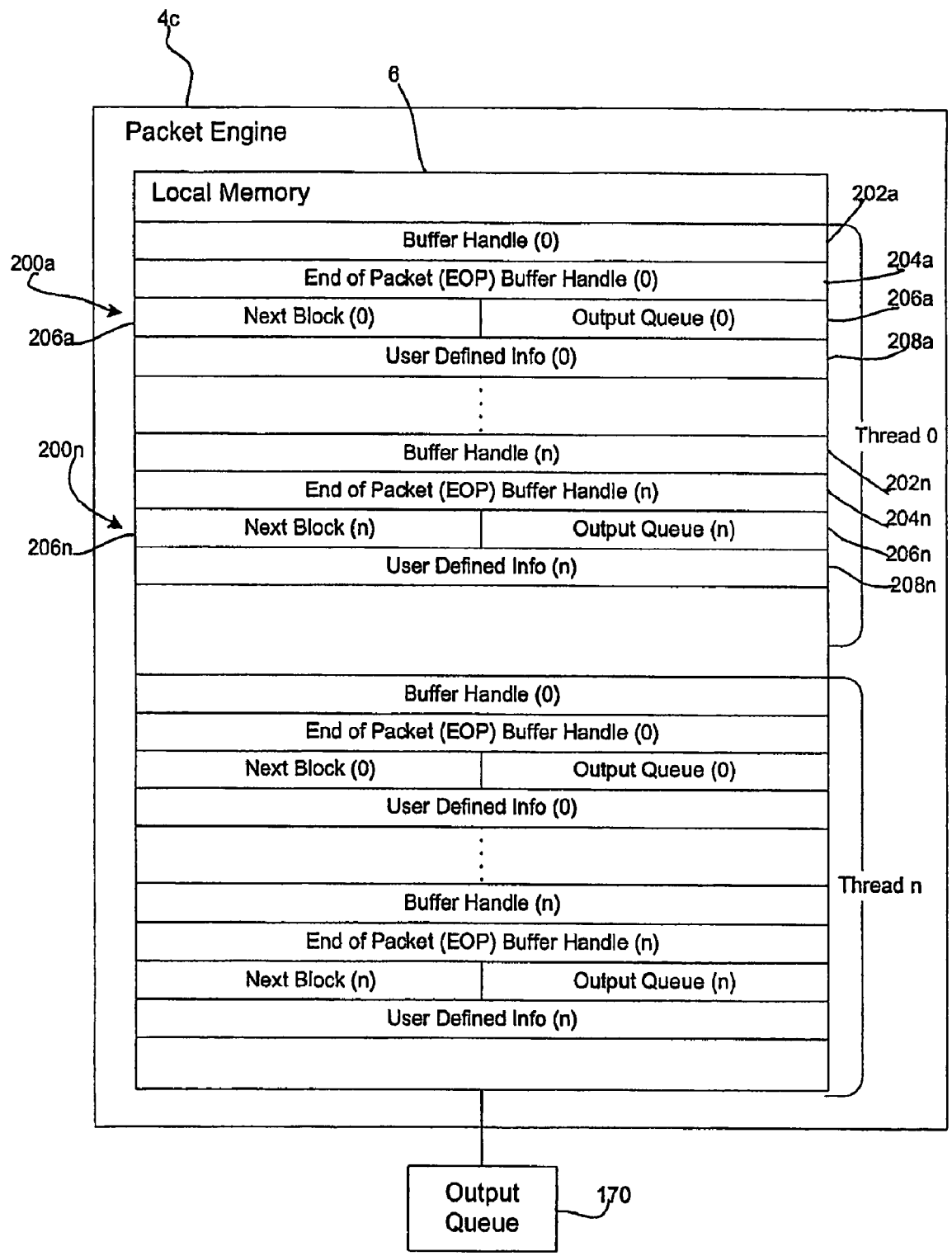
FIG. 9 illustrates information maintained in local memory of a packet engine to process a multicast packet.

FIG. 9 illustrates one embodiment of the information the packet processing block 104 writes to the local memory 6. For each destination address, for which a corresponding buffer indicator 50a, 50b . . . 50n and buffer handle 54a, 54b . . . 54n are generated, the packet processing block 104 writes four lines 200a . . . 200n to the local memory 6, including the buffer handle 202a . . . 202n, the end of packet (EOP) field 204a . . . 204n indicating whether the buffer handle is the last; the next block 206a . . . 206n comprising the address in the local memory 6 of the next buffer handle to process; an output queue 208a . . . 208n, such as output queue 170, in which to enqueue the packet generated for the destination address; and additional user defined information 160a . . . 160n. Further, the packet engine 4c may generate multiple threads to process different multicast packets. FIG. 9 shows the packet processing block 104 spawning threads 0 . . . n, where thread 0 processing a set of entries in the local memory 6 for one multicast packet and another thread n independently processes entries in the local memory 6 for another multicast packet.

Figure 10:
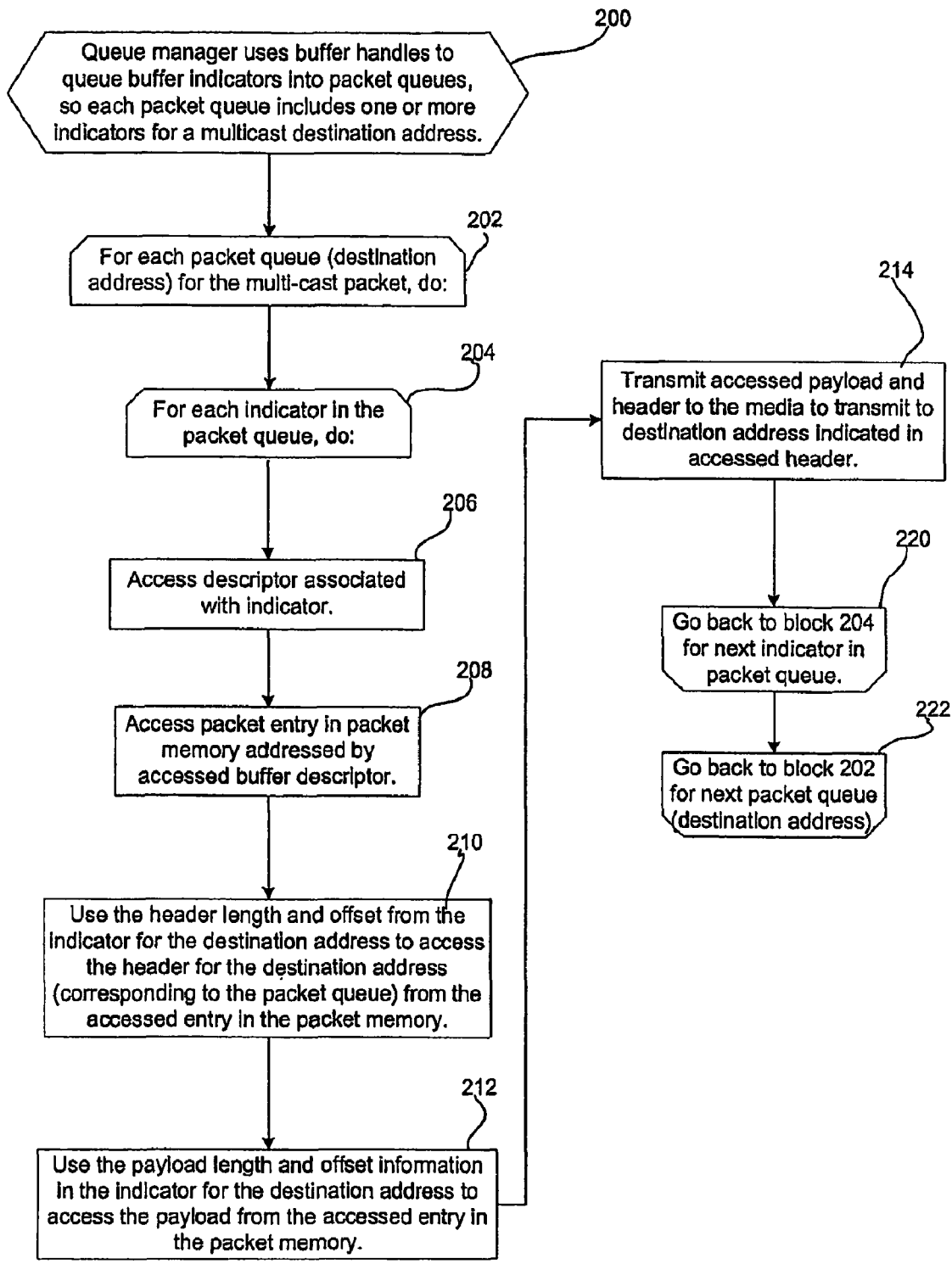

FIG. 10 illustrates one embodiment of the operations performed by the queue manager 106 and transmission 108 blocks to transmit the packets. At block 200, the queue manager block 106 executing in one packet engine 4a, 4b . . . 4n uses buffer handles to queue buffer indicators 30a . . . 30n into packet queues 20a . . . 20n, so each packet queue includes one or more indicators for a multicast destination address. The queue manager block 106 may access the buffer handles from the output queue 170 (FIG. 8). The transmission block 108 then uses the buffer handles to process the indicators to transmit the packet data to the multicast destination addresses. The transmission block 108 performs a loop at blocks 202 through 222 for each packet queue 20a . . . 20n, where each packet queue corresponds to one destination address to receive the payload for the multicast packet. For each packet queue/destination address, another loop of operations is performed at blocks 204 through 220 for each indicator 30a . . . 30n in the packet queue 20a . . . 20n being processed.

For each indicator, the transmission block 108 accesses (at block 206) a descriptor, e.g., buffer descriptor 52, associated with the indicator 50a, 50b . . . 50n. The packet entry 56 in the packet memory 12 addressed by the accessed buffer descriptor 52 is accessed (at block 208). The transmission block 108 uses (at block 210) the header length 76 and offset 78 (FIG. 4) from the indicator 50a, 50b . . . 50n to access the header 96a, 96b . . . 96n (FIG. 6) for the destination address from the accessed entry 56 in the packet memory 12. The accessed payload and header are forwarded (at block 212) to the media, e.g., media switch fabric 110, to transmit to the destination address indicated in the accessed header. In this way, the transmission block 108 transmits the payloads in one or more buffers corresponding to the indicators in multiple packet queues 20a . . . 20n that provide indicators for each destination address.

FIG. 1 illustrates one embodiment of a network processor 300. The network processor 300 shown is an Intel® Internet eXchange network Processor (IXP). Other network processors feature different designs. The network processor 300 shown features a collection of packet engines 304, also known as microengines, programmable engine, etc. The packet engines 304 may be Reduced Instruction Set Computing (RISC) processors tailored for packet processing. For example, the packet engines 304 may not include floating point instructions or instructions for integer multiplication or division commonly provided by general purpose processors. The network processor 300 components may be implemented on a single integrated circuit die.

An individual packet engine 304 may offer multiple threads. For example, the multi-threading capability of the packet engines 304 may be supported by hardware that reserves different registers for different threads and can quickly swap thread contexts. In addition to accessing shared memory, a packet engine may also feature local memory and a content addressable memory (CAM). The packet engines 304 may communicate with neighboring processors 304, for example, using neighbor registers wired to the adjacent engine(s) or via shared memory.

The network processor 300 also includes a core processor 310 (e.g., a StrongARM® XScale®) that is often programmed to perform "control plane" tasks involved in network operations. (StrongARM and XScale are registered trademarks of Intel Corporation). The core processor 310, however, may also handle "data plane" tasks and may provide additional packet processing threads.

As shown, the network processor 300 also features interfaces 302 that can carry packets between the processor 300 and other network components. For example, the processor 300 can feature a switch fabric interface 302 (e.g., a CSIX interface) that enables the processor 300 to transmit a packet to other processor(s) or circuitry connected to the fabric. The processor 300 can also feature an interface 302 (e.g., a System Packet Interface Level 4 (SPI-4) interface) that enables to the processor 300 to communicate with physical layer (PHY) and/or link layer devices. The processor 300 also includes an interface 308 (e.g., a Peripheral Component Interconnect (PCI) bus interface) for communicating, for example, with a host. As shown, the processor 300 also includes other components shared by the engines such as memory controllers 306, 312, a hash engine, and scratch pad memory.

The multicast packet processing operations described above may be implemented on a network processor, such as the IXP, in a wide variety of ways. For example, one or more threads of a packet engine 304 may perform specific queue manager.

In certain embodiments, the packet engine implementing the queue manager operations described with respect to FIGS. 6 and 8 may be implemented in one of the packet engines 304.

Figure 12:
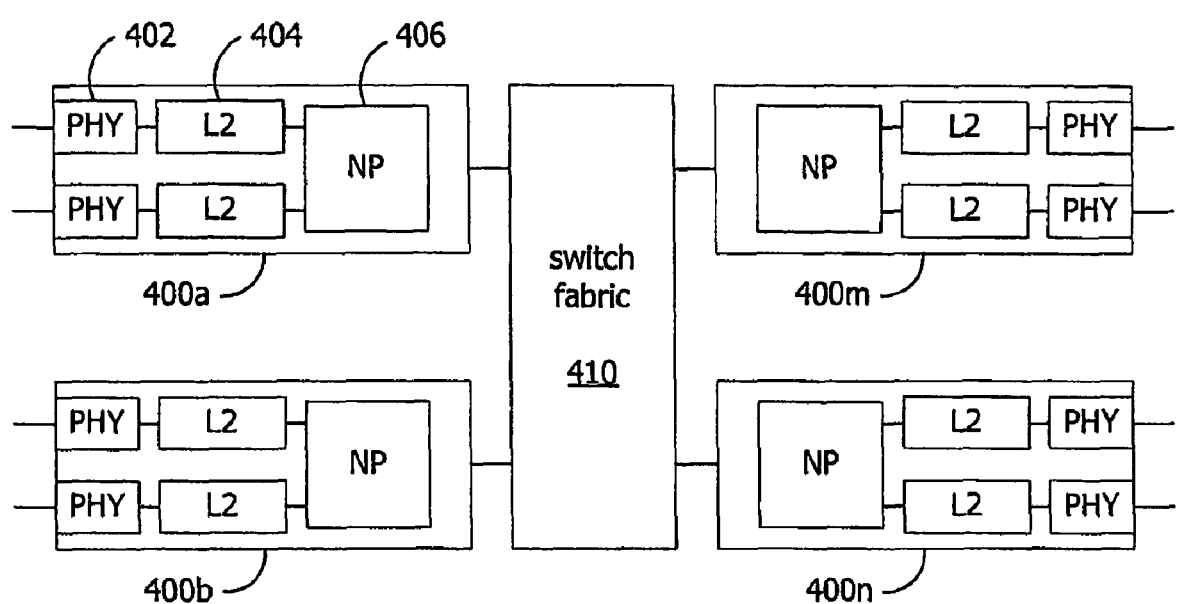
FIG. 12 is a diagram of a network device.

FIG. 12 illustrates one embodiment of a network device incorporating techniques described above. As shown, the device features a collection of line cards 400 ("blades") interconnected by a switch fabric 410 (e.g., a crossbar or shared memory switch fabric). The switch fabric, for example, may conform to CSIX or other fabric technologies such as HyperTransport, Infiniband, PCI-X, Packet-Over-Synchronous Optical Network (SONET), RapidIO, and Utopia. CSIX is described in the publication "CSIX-L1: Common Switch Interface Specification-L1", Version 1.0, published August, 2000 by CSIX; HyperTransport is described in the publication "HyperTransport I/O Link Specification", Rev. 1.03, published by the HyperTransport Tech. Consort., October, 2001; InfiniBand is described in the publication "InfiniBand Architecture, Specification Volume 1", Release 1.1, published by the InfiniBand trade association, November 2002; PCI-X is described in the publication PCI-X 2.0 Specification by PCI-SIG; SONET is described in the publication "Synchronous Optical Network (SONET)—Basic Description including Multiplex Structure, Rates and Formats," document no. T1X1.5 by ANSI (January 2001); RapidIO is described in the publication "RapidIO Interconnect Specification", Rev. 1.2, published by RapidIO Trade Ass'n, June 2002; and Utopia is described in the publication "UTOPIA: Specification Level 1, Version 2.01", published by the ATM Forum Tech. Comm., March, 1994.

Individual line cards (e.g., 400a) include one or more physical layer (PHY) devices 402 (e.g., optic, wire, and wireless PHYs) that handle communication over network connections. The PHYs translate between the physical signals carried by different network mediums and the bits (e.g., "0"-s and "1"-s) used by digital systems. The line cards 300 may also include framer devices (e.g., Ethernet, Synchronous Optic Network (SONET), High-Level Data Link (HDLC) framers or other "layer 2" devices) 404 that can perform operations on frames such as error detection and/or correction. The line cards 400 shown also include one or more network processors 406 or integrated circuits (e.g., ASICs) that perform packet processing operations for packets received via the PHY(s) 400 and direct the packets, via the switch fabric 410, to a line card providing the selected egress interface. Potentially, the network processor(s) 406 may perform "layer 2" duties instead of the framer devices 404 and the network processor operations described herein.

Figure 11:
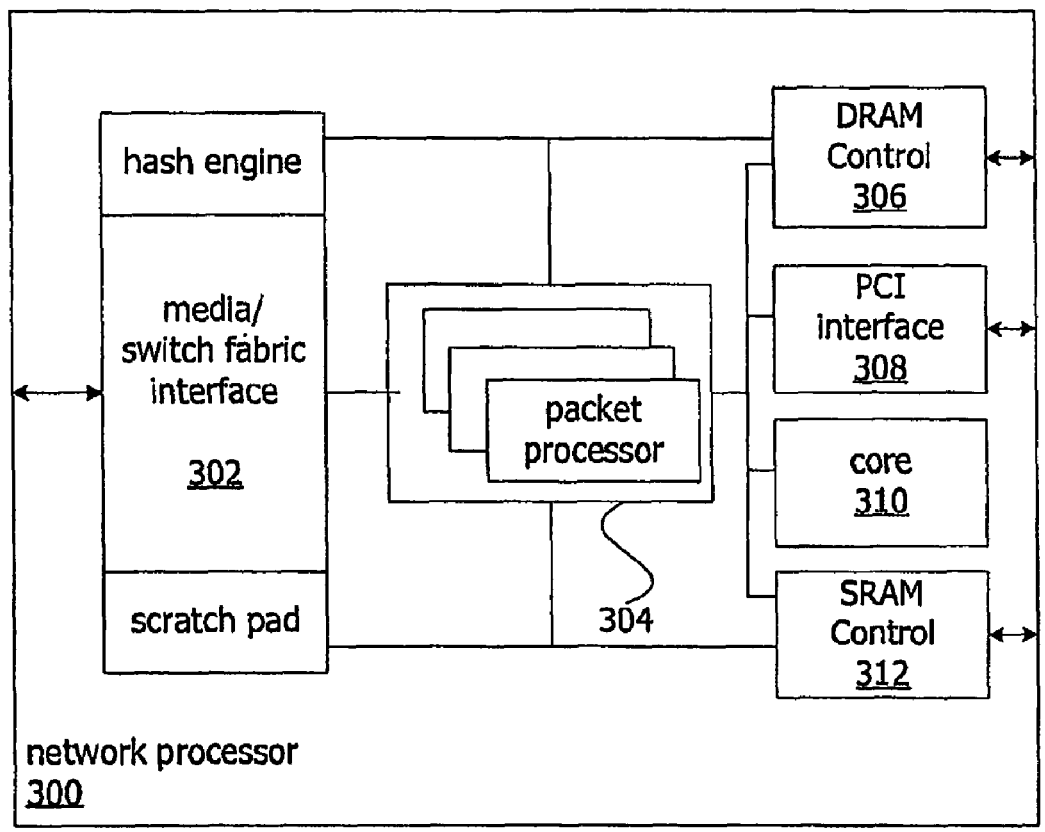
FIG. 11 is a diagram of a network processor.

While FIGS. 11 and 12 describe embodiments of a network processor and a device incorporating network processors, the techniques may be implemented in other hardware, firmware, and/or software. For example, the techniques may be implemented in integrated circuits (e.g., Application Specific Integrated Circuits (ASICs), Gate Arrays, and so forth). Additionally, the techniques may be applied to a wide variety of networking protocols at different levels in a protocol stack and in a wide variety of network devices (e.g., a router, switch, bridge, hub, traffic generator, and so forth).

Additional Embodiment Details

The described embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.), computer accessible medium or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the embodiments, and that the article of manufacture may comprise any information bearing medium known in the art.

The described operations may be performed by circuitry, where "circuitry" refers to either hardware or software or a combination thereof. The circuitry for performing the operations of the described embodiments may comprise a hardware device, such as an integrated circuit chip, Programmable Gate Array (PGA), Application Specific Integrated Circuit (ASIC), etc. The circuitry may also comprise a processor component, such as an integrated circuit, and code in a computer readable medium, such as memory, wherein the code is executed by the processor to perform the operations of the described embodiments.

In certain embodiments, the multicast packet processing operations are performed by a process implemented in a microblock executed by a packet engine, e.g., microengine of a network processor. In additional embodiments, the multicast processing operations may be performed by different types of processors, including central processing units, Input/Output controllers, etc.

The term packet was sometimes used in the above description to refer to a packet conforming to a network communication protocol. However, a packet may also be a frame, fragment, ATM cell, and so forth, depending on the network technology being used. Alternatively, a packet may refer to a unit of data transferred from devices other than network devices, such as storage controllers, printer controllers, etc.

Preferably, the threads are implemented in computer programs such as a high level procedural or object oriented programming language. However, the program(s) can be implemented in assembly or machine language if desired. The language may be compiled or interpreted. Additionally, these techniques may be used in a wide variety of networking environments.

The reference "n" when used to indicate an instance of an element, e.g., buffer handle 54n, buffer indicator 50n, etc., may refer to any integer value and indicate the same or different integer values when used with different elements.

The illustrated operations of FIGS. 8 and 10 show certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments has been presented for the purposes of illustration and description. It is not intended to be exhaustive or to limit the embodiments to the precise form disclosed. Many modifications and variations are possible in light of the above teaching.

What is claimed is:

1. A method, comprising:
   receiving a multicast packet to transmit to destination addresses;
   writing a payload of the multicast packet to at least one packet entry in a packet memory;
   generating headers for the destination addresses;
   generating at least one descriptor addressing the at least one packet entry in the packet memory including the payload to transmit to the destination addresses;
   generating a packet queue for each of the destination addresses; and
   including, in each of the packet queues, at least one indicator, wherein each indicator in each of the packet queues addresses one descriptor, wherein the indicators in the packet queues for the destination addresses point to a same set of descriptors to associate the destination addresses with the same set of descriptors, wherein each descriptor identifies at least one packet entry to be provided for the destination addresses having indicators addressing the packet entries.

2. The method of claim 1, wherein the payload is written to multiple packet entries in the packet memory, wherein one descriptor is generated for each packet entry including the payload, and wherein one indicator is generated for each descriptor and destination address to which the payload in the packet entry addressed by the descriptor is transmitted.

3. The method of claim 2, further comprising:
   for each destination address, setting a next handle in the indicators for the destination address to point to the indicator corresponding to the descriptor addressing a next entry in the packet memory including further payload data for the destination address.

4. The method of claim 1, wherein the payload is written to one packet entry in the packet memory, wherein one descriptor is generated for the packet entry including the payload, and wherein one indicator is generated for each destination address to which the payload in the packet entry addressed by the descriptor is transmitted.

5. The method of claim 1, further comprising:
   generating a handle for each generated indicator addressing the indicator in a queue.

6. The method of claim 1, further comprising:
   using, for each destination address and indicator associated with the destination address, the information on the generated header in the at least one indicator for the destination address to access the header for the destination address; and
   transmitting, for each destination address and indicator associated with the destination address, the payload from the entry in the packet memory associated with the indicator and the accessed header for the destination address.

7. The method of claim 6, further comprising:
   using, for each destination address, the header length and offset from the at least one indicator for the destination address to access the header for the destination address from the at least one entry in the packet memory addressed by the at least one descriptor identified in the at least one indicator for the destination address; and
   transmitting, for each destination address, the payload from the entry in the packet memory and the accessed header for the destination address.

8. The method of claim 1, further comprising:
writing the generated headers to each entry in the packet memory including packet payload, wherein the information on the header in one indicator for one destination address includes a header length and offset used to extract the header from the entry in the packet memory for the destination address for which the indicator is generated.

9. The method of claim 8, wherein the indicator further includes information on a payload length and payload offset used to extract the payload from the entry for the destination address for which the indicator is generated, further comprising:
using, for each destination address, the payload length and offset information in the at least one indicator for the destination address to access the payload from the at least one entry in the packet memory addressed by the at least one descriptor identified in the at least one indicator for the destination address.

10. The method of claim 1, further comprising:
writing to a local memory at least one handle for each destination address addressing the at least one indicator for the destination address;
writing the handles in the local memory to an output queue; and
queuing the indicators corresponding to the handles in the output queue to at least one packet queue.

11. The method of claim 10, further comprising:
writing, to the local memory, information on the output queue for the handle written to the local memory indicating the output queue to which the destination packet generated from the indicator addressed by the handle is queued.

12. The method of claim 10, wherein a packet processing block performs the operations of writing the payload, generating the headers, generating the at least one descriptor, generating the at least one indicator, writing the handles to the local memory, and writing the handles to the output queue, and where a transmission block uses the handles to access the indicators for the destination address to send the payload to the destination addresses.

13. A system, comprising:
a packet memory; and
circuitry in communication with the packet memory and enabled to:
receive a multicast packet to transmit to destination addresses;
write a payload of the multicast packet to at least one packet entry in the packet memory;
generate headers for the destination addresses;
generate at least one descriptor addressing the at least one packet entry in the packet memory including the payload to transmit to the destination addresses;
generate a packet queue for each of the destination addresses; and
include, in each of the packet queues, at least one indicator, wherein each indicator in each of the packet queues addresses one descriptor, wherein the indicators in the packet queues for the destination addresses point to a same set of descriptors to associate the destination addresses with the same set of descriptors, wherein each descriptor identifies at least one packet entry to be provided for the destination addresses having indicators addressing the packet entries.

14. The system of claim 13, wherein the payload is written to multiple packet entries in the packet memory, wherein one descriptor is generated for each packet entry including the payload, and wherein one indicator is generated for each descriptor and destination address to which the payload in the packet entry addressed by the descriptor is transmitted.

15. The system of claim 14, wherein the circuitry is enabled to:
for each destination address, set a next handle in the indicators for the destination address to point to the indicator corresponding to the descriptor addressing a next entry in the packet memory including further payload data for the destination address.

16. The system of claim 13, wherein the payload is written to one packet entry in the packet memory, wherein one descriptor is generated for the packet entry including the payload, and wherein one indicator is generated for each destination address to which the payload in the packet entry addressed by the descriptor is transmitted.

17. The system of claim 13, wherein the circuitry is further enabled to:
generate a handle for each generated indicator addressing the indicator in a queue.

18. The system of claim 13, wherein the circuitry is further enabled to:
use, for each destination address and indicator associated with the destination address, the information on the generated header in the at least one indicator for the destination address to access the header for the destination address; and
transmit, for each destination address and indicator associated with the destination address, the payload from the entry in the packet memory associated with the indicator and the accessed header for the destination address.

19. The system of claim 18, wherein the circuitry is further enabled to:
use, for each destination address, the header length and offset from the at least one indicator for the destination address to access the header for the destination address from the at least one entry in the packet memory addressed by the at least one descriptor identified in the at least one indicator for the destination address; and
transmit, for each destination address, the payload from the entry in the packet memory and the accessed header for the destination address.

20. The system of claim 13, wherein the circuitry is further enabled to:
write the generated headers to each entry in the packet memory including packet payload, wherein the information on the header in one indicator for one destination address includes a header length and offset used to extract the header from the entry in the packet memory for the destination address for which the indicator is generated.

21. The system of claim 20, wherein the indicator further includes information on a payload length and payload offset used to extract the payload from the entry for the destination address for which the indicator is generated, wherein the circuitry is further enabled to:
use, for each destination address, the payload length and offset information in the at least one indicator for the destination address to access the payload from the at least one entry in the packet memory addressed by the at least one descriptor identified in the at least one indicator for the destination address.

22. The system of claim 13, further comprising:
a local memory;
wherein the circuitry is further enabled to:
  write to the local memory at least one handle for each destination address addressing the at least one indicator for the destination address;
  write the handles in the local memory to an output queue; and
  queue the indicators corresponding to the handles in the output queue to at least one packet queue.

23. The system of claim 22, wherein the circuitry is further enabled to:
  write, to the local memory, information on one output queue for the handle written to the local memory indicating the output queue to which the destination packet generated from the indicator addressed by the handle is queued.

24. The system of claim 22, wherein a packet processing block performs the operations of writing the payload, generating the headers, generating the at least one descriptor, generating the at least one indicator, writing the handles to the local memory, and writing the handles to the output queue, and where a transmission block uses the handles to access the indicators for the destination address to send the payload to the destination addresses.

25. The system of claim 24, wherein the circuitry comprises a plurality of packet engines, wherein one packet engine executes the packet processing block and another packet engine executes the transmission block.

26. A system, comprising:
a switch fabric; and
a plurality of line cards coupled to the switch fabric, wherein each line card includes a network processor, wherein each network processor includes:
a packet memory; and
circuitry in communication with the packet memory and enabled to:
  receive a multicast packet to transmit to destination addresses;
  write a payload of the multicast packet to at least one packet entry in the packet memory;
  generate headers for the destination addresses;
  generate at least one descriptor addressing the at least one packet entry in the packet memory including the payload to transmit to the destination addresses;
  generating a packet queue for each of the destination addresses; and
  include, in each of the packet queues, at least one indicator, wherein each indicator in each of the packet queues addresses one descriptor, wherein the indicators in the packet queues for the destination addresses point to a same set of descriptors to associate the destination addresses with the same set of descriptors, wherein each indicator's descriptor identifies at least one packet entry to be provided for the destination addresses having indicators addressing the packet entries.

27. The system of claim 26, wherein the payload is written to multiple packet entries in the packet memory, wherein one descriptor is generated for each packet entry including the payload, and wherein one indicator is generated for each descriptor and destination address to which the payload in the packet entry addressed by the descriptor is transmitted.

28. The system of claim 26, wherein the circuitry is further enabled to:
  write the generated headers to each entry in the packet memory including packet payload, wherein the information on the header in one indicator for one destination address includes a header length and offset used to extract the header from the entry in the packet memory for the destination address for which the indicator is generated.

29. An article of manufacture comprising hardware or a combination of hardware and software having code executed to transmit packets, communicate with a packet memory, and perform operations, the operations comprising:
  receiving a multicast packet to transmit to destination addresses;
  writing a payload of the multicast packet to at least one packet entry in a packet memory;
  generating headers for the destination addresses;
  generating at least one descriptor addressing the at least one packet entry in the packet memory including the payload to transmit to the destination addresses;
  generating a packet queue for each of the destination addresses; and
  including, in each of the packet queues, at least one indicator, wherein each indicator in each of the packet queues addresses one descriptor, wherein the indicators in the packet queues for the destination addresses point to a same set of descriptors to associate the destination addresses with the same set of descriptors, wherein each descriptor identifies at least one packet entry to be provided for the destination addresses having indicators addressing the packet entries.

30. The article of manufacture of claim 29, wherein the payload is written to multiple packet entries in the packet memory, wherein one descriptor is generated for each packet entry including the payload, and wherein one indicator is generated for each descriptor and destination address to which the payload in the packet entry addressed by the descriptor is transmitted.

31. The article of manufacture of claim 30, wherein the operations further comprise:
  for each destination address, setting a next handle in the indicators for the destination address to point to the indicator corresponding to the descriptor addressing a next entry in the packet memory including further payload data for the destination address.

32. The article of manufacture of claim 29, wherein the payload is written to one packet entry in the packet memory, wherein one descriptor is generated for the packet entry including the payload, and wherein one indicator is generated for each destination address to which the payload in the packet entry addressed by the descriptor is transmitted.

33. The article of manufacture of claim 29, wherein the operations further comprise:
  generating a handle for each generated indicator addressing the indicator in a queue.

34. The article of manufacture of claim 29, wherein the operations further comprise:
  using, for each destination address and indicator associated with the destination address, the information on the generated header in the at least one indicator for the destination address to access the header for the destination address; and
  transmitting, for each destination address and indicator associated with the destination address, the payload from the entry in the packet memory associated with the indicator and the accessed header for the destination address.

35. The article of manufacture of claim 34, wherein the operations further comprise:

using, for each destination address, the header length and offset from the at least one indicator for the destination address to access the header for the destination address from the at least one entry in the packet memory addressed by the at least one descriptor identified in the at least one indicator for the destination address; and transmitting, for each destination address, the payload from the entry in the packet memory and the accessed header for the destination address.

36. The article of manufacture of claim 29, wherein the operations further comprise:

writing the generated headers to each entry in the packet memory including packet payload, wherein the information on the header in one indicator for one destination address includes a header length and offset used to extract the header from the entry in the packet memory for the destination address for which the indicator is generated.

37. The article of manufacture of claim 36, wherein the indicator further includes information on a payload length and payload offset used to extract the payload from the entry for the destination address for which the indicator is generated, further comprising:

using, for each destination address, the payload length and offset information in the at least one indicator for the destination address to access the payload from the at least one entry in the packet memory addressed by the at least one descriptor identified in the at least one indicator for the destination address.

38. The article of manufacture of claim 29, wherein the article of manufacture is further coupled to a local memory, wherein the operations further comprise:

writing to the local memory at least one handle for each destination address addressing the at least one indicator for the destination address;

writing the handles in the local memory to an output queue; and queuing the indicators corresponding to the handles in the output queue to at least one packet queue.

39. The article of manufacture of claim 38, further comprising:

writing, to the local memory, information on one output queue for the handle written to the local memory indicating the output queue to which the destination packet generated from the indicator addressed by the handle is queued.

40. The article of manufacture of claim 38, wherein a packet processing block performs the operations of writing the payload, generating the headers, generating the at least one descriptor, generating the at least one indicator, writing the handles to the local memory, and writing the handles to the output queue, and where a transmission block uses the handles to access the indicators for the destination address to send the payload to the destination addresses.

\* \* \* \* \*